(12) United States Patent
Greenspan et al.

(10) Patent No.: US 9,578,004 B2
(45) Date of Patent: Feb. 21, 2017

(54) AUTHENTICATION OF API-BASED ENDPOINTS

(71) Applicants: Steven L. Greenspan, Scotch Plains, NY (US); Charley Chell, San Jose, CA (US)

(72) Inventors: Steven L. Greenspan, Scotch Plains, NY (US); Charley Chell, San Jose, CA (US)

(73) Assignee: CA, Inc., New York, NY (US)

( * ) Notice: Subject to any disclaimer, the term of this patent is extended or adjusted under 35 U.S.C. 154(b) by 90 days.

(21) Appl. No.: 14/485,662

(22) Filed: Sep. 12, 2014

(65) Prior Publication Data

US 2016/0080355 A1    Mar. 17, 2016

(51) Int. Cl.
*G06F 21/62* (2013.01)
*H04L 29/06* (2006.01)
*G06F 21/51* (2013.01)
*G06F 21/57* (2013.01)

(52) U.S. Cl.
CPC .............. *H04L 63/08* (2013.01); *G06F 21/51* (2013.01); *G06F 21/577* (2013.01); *G06F 2221/2103* (2013.01)

(58) Field of Classification Search
CPC ........ H04L 9/32; H04L 9/3242; H04L 9/3244; H04L 9/3273; H04L 29/06755; H04L 29/06816; H04L 29/12518; H04L 61/2571; H04L 63/0869; H04L 63/083; G06F 21/51; G06F 21/577
USPC ......................................................... 726/6–7
See application file for complete search history.

(56) References Cited

U.S. PATENT DOCUMENTS

| 5,983,350 A * | 11/1999 | Minear ................ H04L 63/0227 709/225 |
| 9,160,742 B1 * | 10/2015 | Ackerman .......... H04L 63/0853 |
| 2001/0044898 A1 * | 11/2001 | Benussi ............. H04L 41/5054 713/173 |

(Continued)

OTHER PUBLICATIONS

Morrison et al., U.S. Appl. No. 14/163,750 titled "Risk-Based Control of Application Interface Transactions," filed Jan. 24, 2014.

*Primary Examiner* — Amir Mehrmanesh
*Assistant Examiner* — Sakinah Taylor
(74) *Attorney, Agent, or Firm* — Baker Botts L.L.P.

(57) ABSTRACT

A method includes detecting an incoming request from a first application to a second application. The method further includes performing an authentication that involves sending a challenge message to a first application. The challenge message may request an account of information associated with processed transactions between the first application and the second application during a particular period preceding the incoming request, a solution to a high-cost calculation associated with a high level of resource use, or a concatenated sequence of characters located at specific positions of a shared value. The authentication further involves receiving a challenge response to the challenge message from the first application, determining a verified response based on the challenge message, and determining whether the challenge response matches the verified response. The method includes authorizing the second application to process the incoming request in response to determining that the challenge response matches the verified response.

17 Claims, 4 Drawing Sheets

(56) References Cited

U.S. PATENT DOCUMENTS

| | | | |
|---|---|---|---|
| 2003/0203756 A1* | 10/2003 | Jackson | G07F 17/32 463/42 |
| 2004/0243517 A1* | 12/2004 | Hansen | G06Q 20/00 705/64 |
| 2008/0046988 A1* | 2/2008 | Baharis | H04L 9/3271 726/7 |
| 2009/0089869 A1* | 4/2009 | Varghese | G06F 21/31 726/7 |
| 2014/0289526 A1* | 9/2014 | Nagai | H04L 9/0819 713/171 |
| 2015/0073987 A1* | 3/2015 | Dutt | G06Q 20/4016 705/44 |

* cited by examiner

AUTHENTICATION OF API-BASED ENDPOINTS

BACKGROUND

The present disclosure relates to security and, more specifically, to authentication techniques for API-based endpoints.

Effective authentication methods are necessary to protect against fraudulent transactions. When a human user initiates a transaction, existing systems have methods for authenticating the user. For example, existing systems may require the user to provide (i) information only the user knows (e.g., password), (ii) information only the user has (e.g., ATM card), or (iii) information only the user is (e.g., a fingerprint). Such systems then may verify the identity of the user by comparing the user's provided information against verified information.

Problems, however, may arise when a transaction is initiated by an application instead of a human user. Many if not all user authentication methods, although effective against human imposters, are ineffective against API-based endpoints such as applications. Thus, if an imposter impersonates a requesting application or injects a third-party application into a transaction, then the imposter may be able to steer clear of existing authentication methods. Accordingly, new methods must be developed to protect against malicious activity that comes from an API-based endpoint.

BRIEF SUMMARY

According to an embodiment of the present disclosure, a method of performing a authentication includes detecting, via a monitoring device, an incoming request from a first application to a second application. The method further includes performing an authentication, in which the authentication involves sending a challenge message to a first application. The challenge message may include at least one of (i) an account of information associated with processed transactions between the first application and the second application during a particular period preceding the incoming request, (ii) a solution to a high-cost calculation associated with a high level of resource use, and (iii) a concatenated sequence of characters located at specific positions of a shared value. The authentication further involves receiving a challenge response to the challenge message from the first application, determining a verified response based on the challenge message, and determining whether the challenge response matches the verified response. The method includes authorizing the second application to process the incoming request in response to determining that the challenge response matches the verified response.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security, including security management, cloud security, and mobility, systems and methods disclosed herein may also be related to architecture and database management; data modeling and analysis; governance, risk and compliance for information technology ("IT") systems; project, portfolio and financial management; software engineering; storage; cloud environments and cloud computing; mainframe and IT service and asset management; middleware and common services; usability and user experience; vertical specific technology applications; IT business management; application performance management; service assurance; alternative software delivery method; automation; deployment and virtualization; and infrastructure and operations management.

Referring now to security, existing systems may provide secure communication between a user and an application using encryption. These secure communication channels may allow a user to securely conduct transactions with protected applications. Existing systems may also have methods for authenticating a user in a transaction. For instance, when a user is at one end of a transaction channel, existing systems may authenticate the user by asking for (i) information known only to the user, (ii) evidence of something that the user possesses, or (iii) something of the user's physical being. Information known only to the user may include a password or a personal identification number. Something that the user possesses may include a token (e.g., a USB token, a phone token) or a card (e.g., an ATM card, a smart card). And something of the user's physical being may include a fingerprint or other biometric data. This type of authentication is commonly referred to as one-, two-, or three-factor authentication—that is, an authentication which requires a user to present one, two, or three of information elements (i)-(iii).

Existing systems may also provide secure communication between two applications, thus allowing applications to conduct transactions with each other. However, when an application is at one end of a transaction channel, existing systems may not have effective methods for authenticating the application. In particular, the one-, two-, or three-factor authentication scheme described above may not apply to an application.

Applications may generate requests for transactions that carry significant risk. For example, an application may generate a nightly wire transfer to settle large currency amounts between banks. If an imposter impersonates an application or injects a third-party application in the middle of a legitimate transaction, then the imposter, if not authenticated, may perform malicious activity such as creating false requests or altering the intent of the legitimate transaction.

To address concerns with application-initiated transactions, systems and methods disclosed herein may provide methods for authenticating an application. These methods may be referred to as "application authentication" methods. Such systems and methods may provide a means for challenging an application with a stepped-up authentication process that requires the challenged application to provide personal or idiosyncratic information that should only be known to the applications involved in the transaction, or by requesting information that is costly or related to a secret identity of the challenged application. By providing a method of authenticating applications, such systems and methods allow applications to operate more securely and to avoid acting upon or providing information to impersonating applications.

Systems and methods disclosed herein may provide for authentication in situations where a risk detection system observes that a transaction involves a higher than normal risk via one or more risk detection methods. For example, if an application initiates a transaction that involves a monetary amount that is greater than a predetermined amount—for instance, if a transaction involves a wire transfer of more than $5,000—then systems and methods disclosed herein may determine that a step-up or additional authentication of the application is required. As another example, suppose an application initiates a transaction that involves an amount that is significantly greater than an average of the amounts in previous transactions, such systems and methods may determine that the current transaction involves a greater degree of risk and determine that a step-up authentication of the application is required.

Further, such systems and methods disclosed herein may require an application to be authenticated on a random basis with a defined probability between zero and one. If the defined probability is set to one, then such systems and methods may require authentication each time an application initiates a transaction. Such a requirement may ensure that an application does not escape authentication by only initiating transactions that do not appear to have high risk. Thus, for instance in the example above, if an application (or user managing the application) knew that a high risk transaction had to involve a monetary amount greater than $5,000, then, to escape the need to authenticate, the application may request only amounts less than $5,000. And in the event that the application needs more than $5,000, it may simply make more than one request—that is, if the application needed $7,000 (which is greater than $5,000), the application would merely initiate two transactions for less than $5,000 that add up to $7,000.

Systems and methods disclosed herein may provide an application authentication method involving a transaction history step-up challenge. Specifically, after determining to authenticate an application that sends a transaction request to a protected application (due to detection of high risk or on a random basis), systems and methods disclosed herein may request that the requesting application provide a summary hash (e.g., a value generated using a hash function), a checksum (e.g., a value generated using a checksum function), or a digest (e.g., a value generated using a message digest function) of a set of transactions that the requesting application (or whichever application the requesting application is imitating) has previously made with the protected application. For example, such systems and methods may choose to have the requesting application compute a summary hash of a random set of previous transactions that span a reasonably large time frame. This time frame should be longer than the amount of time that a man-in-the-middle ("MITM") or attacking application is likely to have been present. Such systems and methods may similarly have the protected application compute the summary hash or compute the summary hash on behalf of the protected application. Since only the true requesting application would have knowledge of its previous transactions with the protected application, such systems and methods then may compare the two summary hashes to determine whether the requesting application is an imposter. If the two summary hashes are the same, then the requesting application would have confirmed its identity. If, however, the two summary hashes are different, then the requesting application would be flagged as an imposter. In order for an application such as a passive listener to defeat this authentication method, it would have to be installed for a long period of time, likely exposing it to other security detection mechanisms.

To provide a specific example of this method, suppose a requesting application sends a request involving a high-risk action (e.g., a transfer of a large amount of money) to a protected application. An authentication system according to an example embodiment of the present disclosure may detect and intercept the request. The authentication system may determine that the request carries high risk. The authentication system may then randomly select a set of previous transactions—for instance, five random transactions in the last thirty days—and request that both the requesting application and the protected application compute a hash of the selected transaction data using a mutually agreed-to algorithm. The requesting application, if authentic, would know the transaction history and be able to compute the hash. The protected application would also know the transaction history and be able to compute the hash. Upon receiving hashes from both the requesting application and the protected application, the authentication system may compare the two hashes for equality. If the two hashes are the same, then the authentication system may instruct the protected application to fulfill the request. The protected application would subsequently complete the request and respond to the requesting application.

Systems and methods disclosed herein may also provide an application authentication method involving an expensive computation step-up challenge. Specifically, after determining to authenticate an application that sends a transaction request (due to detection of high risk or on a random basis), systems and methods disclosed herein may ask the requesting application to perform an unpredictable, CPU-intensive calculation such as factoring a large number chosen at random from a predefined list or calculating the sum of several numbers of a sequence. Such systems and methods may already know the answer to the calculation because the answer was pre-calculated and stored on the system. Upon receiving an answer from the requesting application, such systems and methods then may compare the requesting application's answer to the known answer to determine whether the requesting application is an imposter. Since the requesting application must expend time and resources to perform the calculation, this method would be a deterrent to attackers.

Systems and methods disclosed herein further may provide an application authentication method involving a partial value step-up challenge. This challenge may depend on a long shared value that is communicated between the true requesting application and the protected application during an earlier provisioning process. The authentication method may involve validating only a part of the shared value, thus making it difficult for an imposter or passive listener to obtain the whole shared value. Specifically, after determining to authenticate an application that sends a transaction request (due to detection of high risk or on a random basis), systems and methods disclosed herein may request that the requesting application produce a substring of the shared value (e.g., a concatenated string of a random set of requested digits or characters such as, for example, the 1st, 5th, 6th, and 27th positions of the shared value). Such systems and methods also may request that the protected application produce the same substring, or alternatively, such systems and methods may maintain the shared value and produce the substring on behalf of the protected application. Such systems and methods then may compare the two substrings in order to verify the identity of the requesting application.

Systems and methods disclosed herein also may provide these application authentication methods as primary authentication methods, where authentication is performed in response to receiving a request from the requesting application to authenticate itself via a transaction history, expensive computation, or partial shared value process. For example, a requesting application may contact an authentication system and request to authenticate itself by providing transaction history data. In response to receiving the request, systems and methods disclosed herein may return a random set of transactions to include in a summary hash. Then, upon receiving the summary hash from the requesting application, such systems and methods may validate the summary hash.

As another example, a requesting application may contact the authentication system and request to authenticate itself by providing a substring of a shared value. In response to receiving the request, systems and methods disclosed herein may identify a random set of requested digits or characters to include in the substring. Then, upon receiving the substring from the requesting application, such systems and methods may validate the substring.

Figure 1:
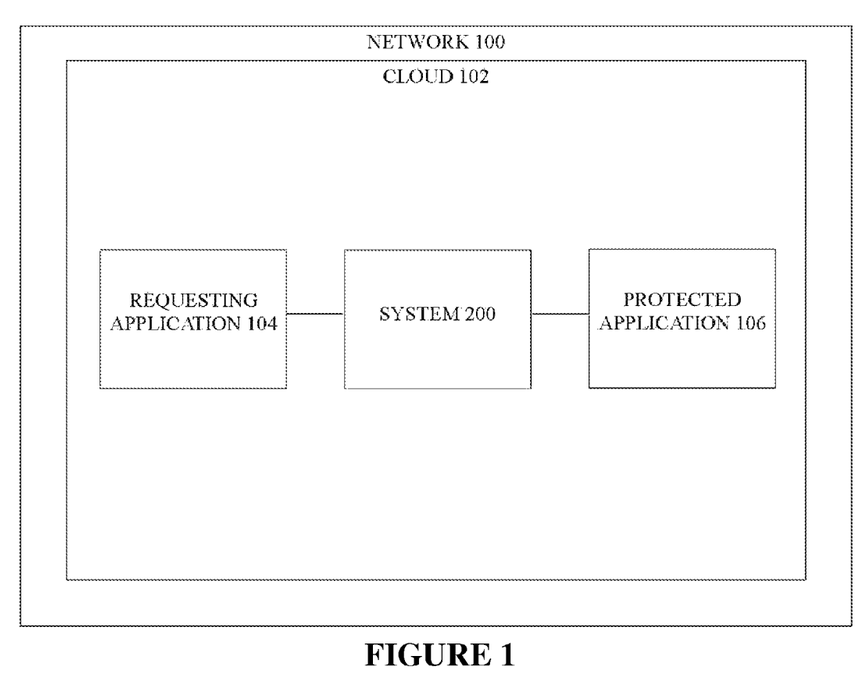
FIG. 1 is a schematic representation of an example network for performing an authentication of a first application, according to one embodiment of present disclosure.

Referring now to FIG. 1, an example network 100 for performing an authentication of a first application is described. Network 100 may comprise one or more clouds 102, which may be public clouds, private clouds, or community clouds. Each cloud 102 may permit the exchange of information and services among users that are connected to such clouds 102. In certain configurations, cloud 102 may be a wide area network, such as the Internet. In some configurations, cloud 102 may be a local area network, such as an intranet. Further, cloud 102 may be a closed, private network in certain configurations, and cloud 102 may be an open network in other configurations. Cloud 102 may facilitate wired or wireless communications of information and provisioning of services among users and applications that are connected to cloud 102.

Network 100 may comprise one or more servers operated by service providers, information providers, and other parties. Network 100 also may comprise one or more devices utilized by service consumers, information consumers, and other parties. Service providers and information providers may provide information and services to information consumers and service consumers utilizing the one or more servers, which connect to the one or more devices via cloud 102. The services may comprise, for example, information technology services, financial services, business services, access services, monitoring services, operations services, infrastructure services, and other resource-provisioning services. The servers may comprise, for example, one or more of general purpose computing devices, specialized computing devices, mainframe devices, wired devices, wireless devices, monitoring devices, infrastructure devices, and other devices configured to provide one or more of services and information to information consumers and service consumers. The devices may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Applications such as requesting applications 104 and protected applications 106 may run on one or more of the servers and devices. Requesting applications 104 may initiate transactions with protected applications 106 by sending requests for services and information to protected applications 106. Requesting applications 104 and protected applications 106 may be API-based endpoints.

Moreover, network 100 may comprise one or more systems 200. System 200 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 200 may connect to network 100 and monitor the servers and devices connected to clouds 102 for available information from or about network 100, clouds 102, and the servers and devices connected to clouds 102 and for available information from or about requesting applications 104 and protected applications 106.

By collecting and receiving available information from or about requesting applications 104 and protected applications 106, system 200 may protect the security of transactions conducted between requesting applications 104 and protected applications 106. Specifically, system 200 may detect an incoming request from a requesting application 104 to a protected application 106. System 200 may determine to perform an authentication based on the incoming request. The authentication may involve sending a challenge message to requesting application 104, where the challenge question requests one or more of (i) an account of information associated with a set of previously processed transactions between requesting application 104 and protected application 106, (ii) a solution to a high-cost calculation, and (iii) a concatenated sequence of characters located at specific positions of a secret value that was previously shared between requesting application 104 and protected application 106. In response to receiving the challenge question, requesting application 104 may send a challenge response to system 200. System 200 then may compare the challenge response with a verified response to determine whether to authorize the incoming request.

Figure 2:
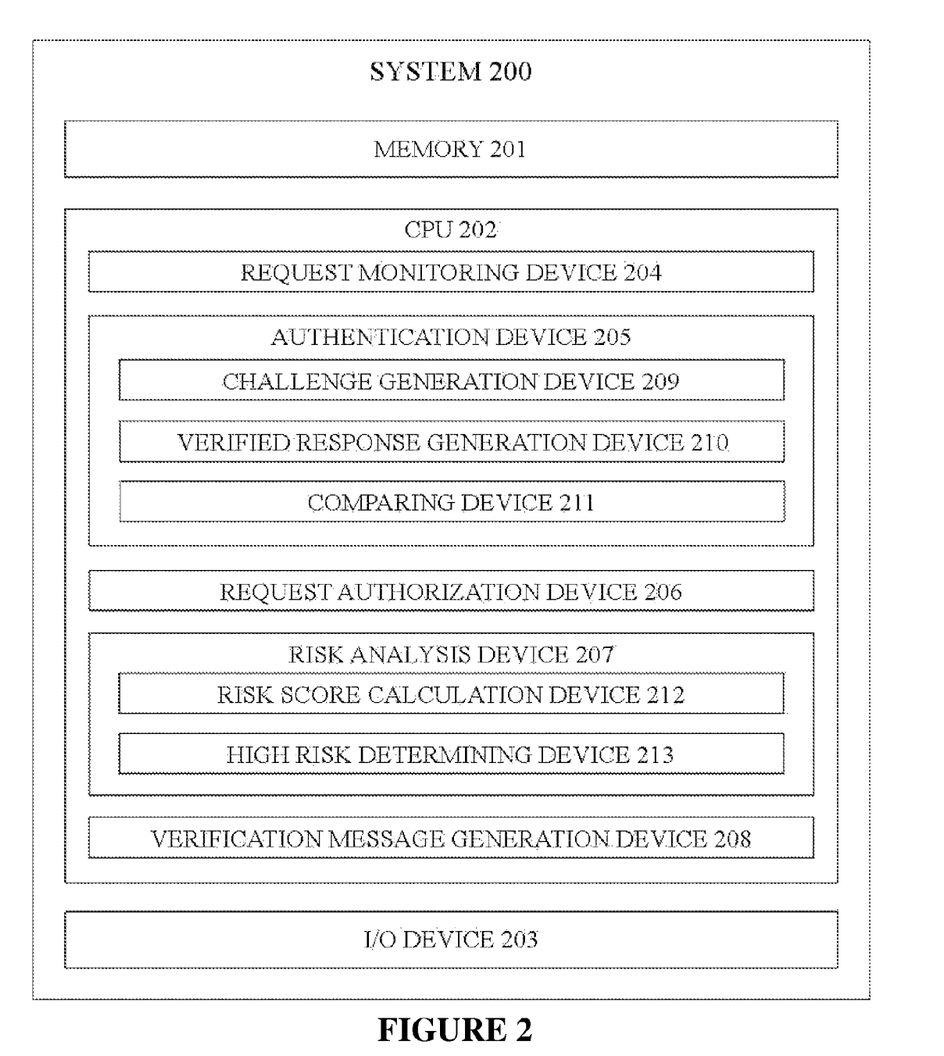
FIG. 2 is a schematic representation of an example system configured to perform an authentication of a first application, according to one embodiment of present disclosure.

Referring now to FIG. 2, system 200, which is configured to perform an authentication of a first application, now is described. System 200 may comprise a memory 201, a central processing unit ("CPU") 202, and an input and output ("I/O") device 203. Memory 201 may store computer-readable instructions that may instruct system 200 to perform certain processes. In particular, when executed by CPU 202, the computer-readable instructions stored in memory 201 may instruct CPU 202 to operate as one or more of a request monitoring device 204, an authentication device 205, a request authorization device 206, a risk analysis device 207, and a verification message generation device 208. CPU 202, acting as authentication device 205, may further act as a challenge generation device 209, a verified response generation device 210, and a comparing device 211. And CPU 202, acting as risk analysis device 207 may further act as a risk score calculation device 212 and a high risk determining device 213. In particular configurations, one or more of request monitoring device 204, authentication device 205, request authorization device 206, risk analysis device 207, verification message generation device 208, challenge generation device 209, verified response generation device 210, comparing device 211, risk score calculation device 212, and high risk determining device 213 may be implemented on one or more different CPUs, which may be comprised in remote or local devices.

I/O device 203 may receive one or more of data from cloud 102, data from other devices and sensors connected to system 200, and input from a user and provide such information to CPU 202. I/O device 203 may transmit data to cloud 102, may transmit data to other devices connected to system 200, and may transmit a notification to a user (e.g., display a message, make a sound, send an email, make a telephone call). Further, I/O device 203 may implement one or more of wireless and wired communication between system 200 and other devices.

Figure 3:
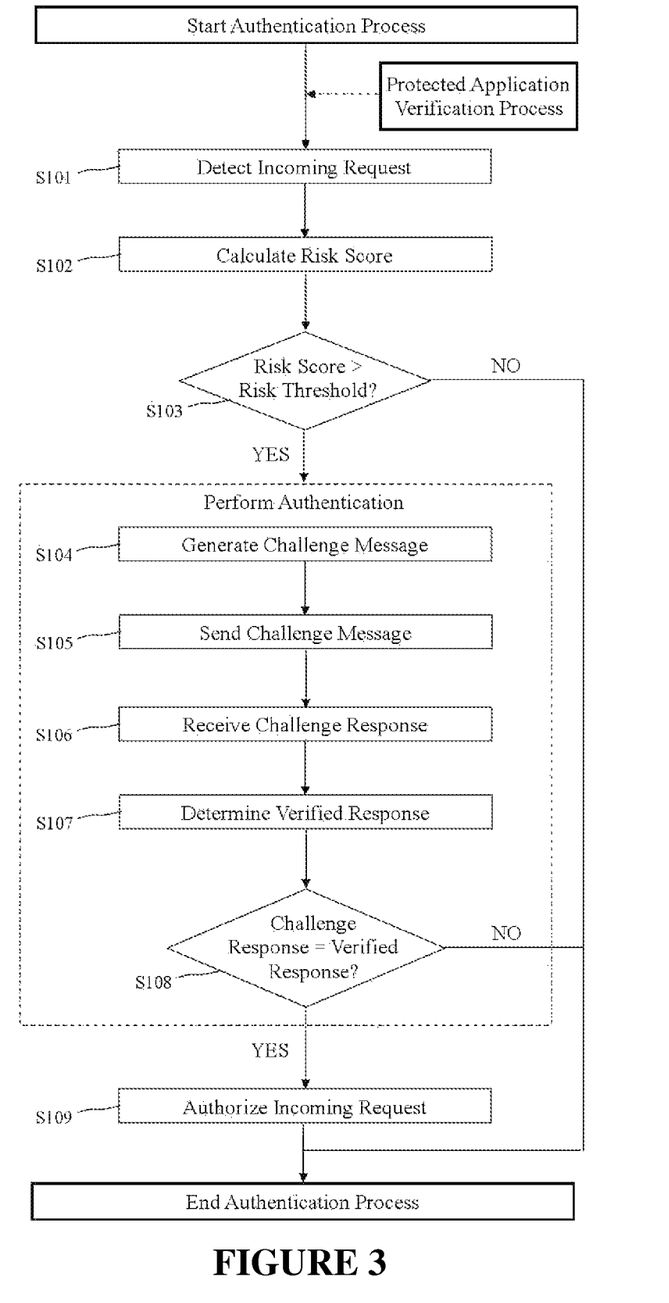
FIG. 3 is a flow chart depicting an example process of performing an authentication of a first application, according to one embodiment of present disclosure, the authentication including sending a challenge message to the first application, receiving a challenge response to the challenge message from the first application, determining a verified response based on the challenge message, and determining whether the challenge response matches the verified response.
Figure 4:
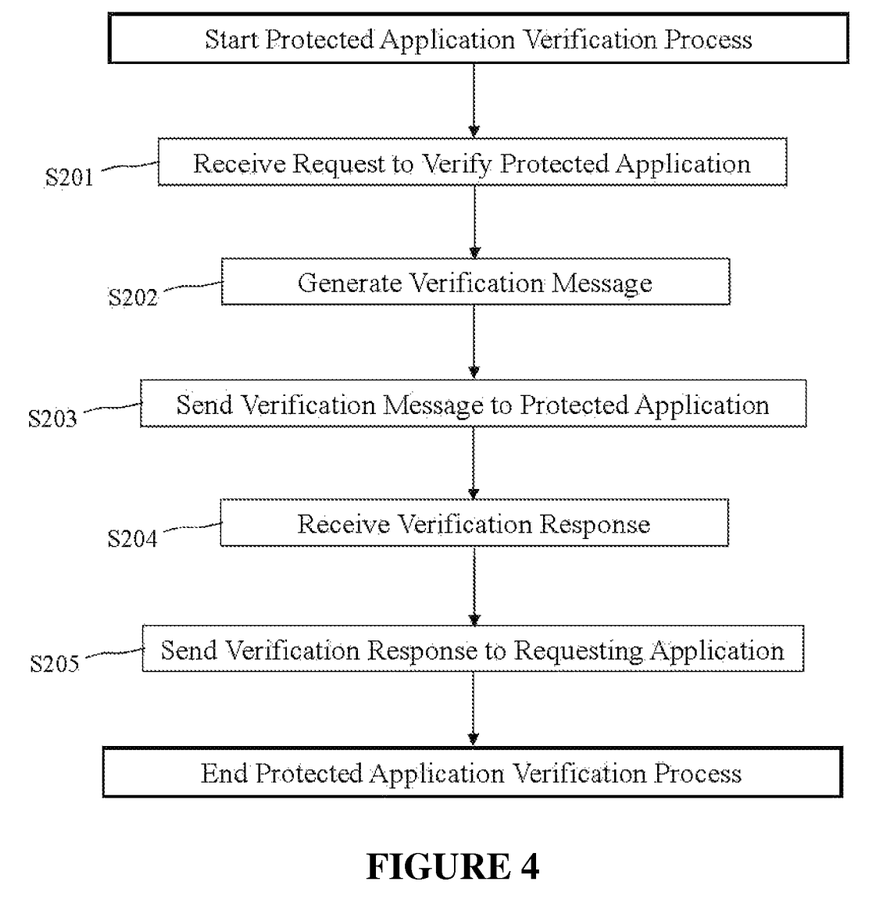
FIG. 4 is a flow chart depicting an example process of verifying a second application when the authentication of a first application is performed.

Referring now to FIGS. 3 and 4, example processes performed by request monitoring device 204, authentication device 205, request authorization device 206, risk analysis device 207, verification message generation device 208, challenge generation device 209, verified response generation device 210, comparing device 211, risk score calculation device 212, and high risk determining device 213 now are described.

FIG. 3 depicts an example process of performing a step-up or additional authentication. A requesting application 104 may initiate a transaction with a protected application 106 by sending an incoming request to protected application 106. The incoming request may request an exchange of services, information, goods, or money. In S101, request monitoring device 204 may detect the incoming request sent by requesting application 104. In S102, risk analysis device 207, acting as risk score calculating device 212, may calculate a risk score for the incoming request based on at least the type of transaction associated with the request or a geographic location from which the incoming request originated. For example, risk score calculating device 212 may calculate a high risk score for a transaction that involves an exchange of money greater than a predetermined amount (e.g., $5,000). As another example, risk score calculating device 212 may calculate a high risk score for a transaction that involves an exchange of money that differs more than a certain percentage (e.g., 10%) or amount (e.g., $1,000) from the amount(s) in previous transactions between requesting application 104 and protected application 106. As a further example, risk score calculating device 212 may calculate a high risk score for a transaction that originated from a location that differs from the location(s) where previous transactions between requesting application 104 and protected application 106 have originated. The risk score may be a quantitative measure (e.g., a value between 1 and 100) or a qualitative measure (e.g., low risk, medium risk, high risk). Moreover, the risk score may take into account cumulative risk levels—for example, when a particular incoming request is associated with two factors that fall into the "medium risk" category, risk score calculating device 212 may assign an overall score of "high risk" to account for the combined threat of both risk factors.

In S103, risk analysis device 207, acting as high risk determining device 207 may determine whether the risk score is greater than a predetermined risk threshold. Similar to the risk score, the predetermined risk threshold may be a quantitative value or a qualitative value. Thus, if the risk score is quantitative (e.g., a value between 1 and 100), then the predetermined risk threshold may be a numerical value (e.g., 80). Alternatively, if the risk score is qualitative (e.g., low risk, medium risk, high risk), then the predetermined risk threshold may be a qualitative value (e.g., medium risk). When the risk score is greater than the predetermined risk threshold (e.g., the risk score is greater than 80, the risk score is greater than "medium risk") (S103: YES), the process may proceed to S104 and performs an authentication. And when the risk score is equal to or less than the predetermined risk threshold (S103: NO), the process may terminate.

In certain embodiments of the present disclosure, S102 (calculating a risk score) and S103 (determining whether the risk score is greater than a predetermined threshold) may be omitted. In such embodiments, authentication device 205 may perform the authentication each time it detects an incoming request from a requesting application 104. Alternatively, in other such embodiments, authentication device 205 may perform the authentication on a random basis with a predetermined probability between zero and one.

In S104, authentication device 205, acting as challenge generation device 209, may generate a challenge message to send to requesting application 104. The challenge message may request one or more of (i) an account of information associated with a set of previously processed transactions between requesting application 104 and protected application 106, (ii) a solution to a high-cost calculation, and (iii) a concatenated sequence of characters located at specific positions of a secret value that was previously shared between requesting application 104 and protected application 106.

The first, an account of information associated with a set of previously processed transactions between requesting application 104 and protected application 106, may comprise a hash value of data associated the set of processed transactions, where the hash value is generated using a hash function, a checksum function, or a message digest function. The hash function, checksum function, or message digest function may comprise some computational method that requesting application 104 and protected application 106 have previously used and agreed to. Alternatively, the hash function, checksum function, or message digest function may be provided by authentication device 205 to requesting application 104. Alternatively, the account of information associated with the set of previously processed transactions may be an amount or location associated with one or more previous transactions (e.g., a longitude and latitude of where a previous transaction originated). The second, a solution to a high-cost calculation, may comprise a solution to a CPU-intensive calculation or other calculation that requires significant expenditure of time and/or resources. Examples of CPU-intensive calculations include factoring a large number, calculating the sum of a large sequence of numbers, or another fairly intensive mathematical calculation. The third, a concatenated sequence of characters located at specific positions of a secret value that was previously shared between requesting application 104 and protected application 106, may involve concatenating a random set of requested digits or characters such as, for example, the 1st, 5th, 6th, and 27th positions, of the secret value. The secret or shared value may be a string of characters and numbers that was previously shared between protected application 106 and the true or legitimate requesting entity.

In certain embodiments, authentication device 205 may use an authentication method based on an assigned security level of protected application 106. That is, if protected application 106 requires a high level of security because it deals with highly sensitive items, then authentication device 205 may require a more intensive check—for instance, requesting an account of a set of previously processed transactions between requesting application 104 and protected application 106 that date back at least half a year as opposed to a couple of months, requesting a solution to a high-cost calculation in addition to requesting an account of a set of previously process transactions, etc.

In S105, authentication device 205 may send the challenged message generated by challenge generation device 209 to requesting application 104. Specifically, authentication device 205 may instruct I/O device 203 to send the challenge message to requesting application 104. In S106, authentication device 205 may receive a challenge response to the challenge message from requesting application 104. Specifically, I/O device 203 may receive the challenge response and provide the challenge response to CPU 202 or authentication device 205.

In S107, authentication device 205, acting as verified response generation device 210, may determine a verified response based on the challenge message. In particular, if the challenge message requested an account of a set of previously processed transactions between requesting application 104 and protected application 106—for instance, a hash of the past ten processed transactions between requesting application 104 and protected application 106, or a checksum of all the transactions between requesting application 104 and protected application 106 that occurred in a prior month—then verified response generation device 210 may (i) send a request to protected application 106 to have the same be calculated, (ii) send a message to protected application 106 for its transaction history data with requesting application 104 to be able to calculate the same on behalf of protected application 106, or (iii), if already equipped with transaction history data between requesting application 104 and protected application 106, proceed to calculate the same on behalf of protected application 106. Alternatively, if the challenge message requested a solution to a high-cost calculation, verified response generation device 210 may retrieve the solution from a verified source or calculate the same solution itself. Alternatively again, if the challenge message requested a concatenated sequence of characters located at specific positions of a secret value that was previously shared between requesting application 104 and protected application 106, verified response generation device 210 may send the same request to protected application 106 for the same concatenated sequence or, if previously supplied with the secret value, determine the same concatenated sequence on behalf of protected application 106. In each of these cases, the verified response would be the calculation, sequence, or other value supplied by protected application 106 or determined by verified response generation device 210 (with information supplied by protected application 106) on behalf of protected application 106.

In S108, authentication device 205, acting as comparing device 211, may determine whether the challenge response matches the verified response. If the challenge response matches the verified response (S108: YES), then the process may proceed to S109. If the challenge response does not match the verified response (S108: NO), then the process may terminate.

In S109, request authorization device 206 may then authorize protected application 106 to process the incoming request. Thus, for example, if the incoming request was for the transfer of an amount of money, then request authorization device 206 would instruct protected application 106 to process the request by transferring that amount of money.

In certain embodiments of the present disclosure, when a requesting application 104 sends an incoming request to a protected application 106, it may also send a request to verify protected application 106. This process may be referred to as a "protected application verification process." FIG. 4 provides a detailed view of an example protected application verification process. S201 through S205 may occur before, during, or after S101 through S109.

In S201, system 200 may receive a request to verify a protected application 106 from a requesting application 104. Specifically, I/O device 203 may receive the request to verify protected application 106 and provide the request to verify protected application 106 to CPU 202. In S202, verification message generation device 208 may generate a verification message to send to protected application 106 based on the request. For example, if the request to verify protected application 106 sought certain identifying information about protected application 106 (e.g., a local identity, a local IP address, geographic location information), then verification message generation device 208 may generate a verification message that requested this information from protected application 106. In S203, system 200 may send the verification message to protected application 106. Specifically, CPU 202 may instruct I/O device 203 to send the verification message to protected application 106.

After receiving the verification message, protected application 106 may generate a verification response and send it to system 200. Upon receiving the verification response, system 200 may forward the verification response to requesting application 104. Alternatively, if the information provided by protected application 106 is sensitive or potentially compromising if provided to requesting application 104—for example, if protected application 106 was asked to provide a secret or shared value between requesting application 104 and protected application 106—then system 200 may simply check the verification response to confirm the identity of protected application 106 and provide a response to requesting application 104 that protected application 106 has been verified by a trusted source (e.g., system 200).

The flowcharts and diagrams in FIGS. 1-4 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method of performing a step-up authentication comprising:
   detecting, via a monitoring device, an incoming request from a first application to a second application, wherein the second application is protected;
   in response to detecting the incoming request from the first application to the second application, calculating a risk score for the incoming request based on at least one of: a type of transaction associated with the incoming request, and a geographic location from which the incoming request originated; and
   determining whether the risk score is greater than a predetermined risk threshold;
   performing an authentication in response to determining that the risk score is greater than the predetermined risk threshold, the authentication comprising:
      sending a challenge message to the first application, the challenge message requesting at least one of:
         an account of information associated with a set of previously processed transactions between the first application and the second application during a particular period preceding the incoming request, wherein the account of information comprises a hash value of data associated with the set of processed transactions,
         a solution to a high-cost calculation, the high-cost calculation associated with a high level of resource use, and
         a concatenated sequence of characters located at specific positions of a shared value;
      receiving a challenge response to the challenge message from the first application;
      determining a verified response based on the challenge message; and
      determining whether the challenge response matches the verified response;
   authorizing the second application to process the incoming request in response to determining that the challenge response matches the verified response, wherein authorizing the second application to process the incoming request comprises carrying out the request; and
   terminating the authentication in response to determining the challenged response does not match the verified response.

2. The method of claim 1, wherein performing the authentication comprises performing the authentication on a random basis with a predetermined probability between 0 and 1, wherein a probability of 1 comprises performing the authentication each time the first application initiates a transaction.

3. The method of claim 1, wherein the authentication uses a method based on at least a security level of the second application.

4. The method of claim 1, wherein hash value is generated using one of: a hash function, a checksum function, and a message digest function.

5. The method of claim 1, wherein the high-cost calculation comprises a CPU-intensive calculation.

6. The method of claim 1, further comprising:
   receiving a request to verify the second application from the first application;
   sending a verification message to the second application, the verification message generated based on the request to verify the second application;
   receiving a verification response from the second application; and
   sending the verification response to the first application.

7. A system for performing a step-up authentication comprising:
   a monitoring device configured to detect an incoming request from a first application to a second application, wherein the second application is protected;
   a risk score calculation device configured to, in response to detecting the incoming request from the first application to the second application, calculate a risk score for the incoming request based on at least one of: a type of transaction associated with the incoming request, and a geographic location from which the incoming request originated;
   a high risk determining device configured to determine whether the risk score is greater than a predetermined risk threshold;
   an authentication device configured to perform an authentication in response to determining the risk score is greater than the predetermined risk threshold, the authentication comprising:
      sending a challenge message to the first application, the challenge message requesting at least one of:
         an account of information associated with processed transactions between the first application and the second application during a particular period preceding the incoming request, wherein the account of information comprises a hash value of data associated with the set of processed transactions,
         a solution to a high-cost calculation, the high-cost calculation associated with a high level of resource use, and
         a concatenated sequence of characters located at specific positions of a shared value;
      receiving a challenge response to the challenge message from the first application;
      determining a verified response based on the challenge message; and
      determining whether the challenge response matches the verified response;
   an authorization device configured to authorize the second application to process the incoming request in response to determining that the challenge response matches the verified response, wherein the second application is configured to carry out the request, and
   wherein the authentication device is configured to terminate the authentication in response to determining that the challenge response does not match the verified response, and
   wherein the monitoring device, the risk score calculation device, the high risk determining device, the authentication device, and the authorization device are executed by a CPU.

8. The system of claim 7, wherein the authentication device is configured to perform the authentication on a random basis with a predetermined probability.

9. The system of claim 7, wherein the authentication device is configured to perform the authentication using a method based on at least a security level of the second application.

10. The system of claim 7, wherein the hash value is generated using one of: a hash function, a checksum function, and a message digest function.

11. The system of claim 7, wherein the high-cost calculation comprises a CPU-intensive calculation.

12. The system of claim 7, further comprising:
a first receiver configured to receive a request to verify the second application from the first application;
a first transmitter configured to send a verification message to the second application, the verification message generated based on the request to verify the second application;
a second receiver configured to receive a verification response from the second application; and
a second transmitter configured to send the verification response to the first application.

13. A computer program product stored on a computer readable storage device comprising:
a non-transitory computer readable storage medium having computer readable program code embodied therewith, the computer readable program code comprising:
computer readable program code configured to detect an incoming request from a first application to a second application, wherein the second application is protected;
computer readable program code configured to, in response to detecting the incoming request from the first application to the second application, calculate a risk score for the incoming request based on at least one of: a type of transaction associated with the incoming request, and a geographic location from which the incoming request originated;
computer readable program code configured to determine whether the risk score is greater than a predetermined risk threshold; and
computer readable program code configured to perform an authentication in response to determining that the risk score is greater than the predetermined risk threshold, the authentication comprising:
sending a challenge message to the first application, the challenge message requesting at least one of:
an account of information associated with processed transactions between the first application and the second application during a particular period preceding the incoming request, wherein the account of information comprises a hash value of data associated with the set of processed transactions,
a solution to a high-cost calculation, the high-cost calculation associated with a high level of resource use, and
a concatenated sequence of characters located at specific positions of a shared value;
receiving a challenge response to the challenge message from the first application;
determining a verified response based on the challenge message; and
determining whether the challenge response matches the verified response;
computer readable program code configured to authorize the second application to process the incoming request in response to determining that the challenge response matches the verified response and configured to instruct the second application to carry out the request; and
computer readable program code configured to terminate the authentication in response to determining that the challenge response does not match the verified response.

14. The computer program product according to claim 13, the computer readable program code configured to perform the authentication is configured to perform the authentication on a random basis with a predetermined probability.

15. The computer program product according to claim 13, the computer readable program code configured to perform the authentication is configured to perform the authentication using a method based on at least a security level of the second application.

16. The computer program product according to claim 13, wherein, the hash value is generated using one of: a hash function, a checksum function, and a message digest function.

17. The computer program product according to claim 13, further comprising:
computer readable program code configured to receive a request to verify the second application from the first application;
computer readable program code configured to send a verification message to the second application, the verification message generated based on the request to verify the second application;
computer readable program code configured to receive a verification response from the second application; and
computer readable program code configured to send the verification response to the first application.

\* \* \* \* \*